United States Patent [19]
Drexl

[11] Patent Number: 5,850,899
[45] Date of Patent: Dec. 22, 1998

[54] FRICTION CLUTCH FOR A TRANSMISSION OF A MOTOR VEHICLE AND A CLUTCH DISC FOR A FRICTION CLUTCH

[75] Inventor: Hans Jürgen Drexl, Schonungen, Germany

[73] Assignee: Fichtel & Sachs AG, Schweinfurt, Germany

[21] Appl. No.: 736,642

[22] Filed: Oct. 25, 1996

Related U.S. Application Data

[63] Continuation of Ser. No. 319,429, Oct. 6, 1994, abandoned.

[30] Foreign Application Priority Data

Oct. 8, 1993 [DE] Germany ............................ 43 34 374.0

[51] Int. Cl.⁶ ............................ F16D 13/60; F16D 13/16; B16K 17/02
[52] U.S. Cl. ............................ 192/70.14; 192/70.17
[58] Field of Search ............................ 192/107 R, 107 C, 192/200, 207, 70.14

[56] References Cited

U.S. PATENT DOCUMENTS

| | | | |
|---|---|---|---|
| 4,727,972 | 3/1988 | Mueller | 192/107 C |
| 5,048,659 | 9/1991 | Tojima | 192/107 C |
| 5,085,307 | 2/1992 | Scheer | 192/107 R |
| 5,240,458 | 8/1993 | Linglain et al. | 192/106.2 |
| 5,305,864 | 4/1994 | Strohm | 192/107 C |
| 5,431,269 | 7/1995 | Ament et al. | 192/106.2 |

FOREIGN PATENT DOCUMENTS

| | | |
|---|---|---|
| 0511630 | 11/1992 | European Pat. Off. . |
| 0552387 | 7/1993 | European Pat. Off. . |
| 0554472 | 8/1993 | European Pat. Off. . |
| 0794147 | 2/1936 | France . |
| 4114100 | 11/1992 | Germany . |
| 4334374 | 4/1995 | Germany . |

OTHER PUBLICATIONS

"Handbuch der Kraftfahrzeugtechnik", (extract from the Handbook of Motor Vehicle Technology), Huschmann and Koessler, pp. 514–521, 1973.

*Primary Examiner*—Rodney H. Bonck
*Assistant Examiner*—Saúl J. Rodriquez
*Attorney, Agent, or Firm*—Nils H Ljungman and Associates

[57] ABSTRACT

A friction clutch for a transmission of a motor vehicle has a clutch disc with corresponding friction linings, wherein the friction linings are configured such that a ratio of the outside diameter thereof to an inside diameter thereof is less than about 1.41 and preferably falls in the range of about 1.25 to about 1.38. Also contemplated is a method of using such a friction clutch.

4 Claims, 4 Drawing Sheets

FRICTION CLUTCH FOR A TRANSMISSION OF A MOTOR VEHICLE AND A CLUTCH DISC FOR A FRICTION CLUTCH

This application is a continuation of U.S. patent application Ser. No. 08/319,429, filed on Oct. 6, 1994, and now abandonded, which claims priority from Fed. Rep. of Germany Patent Application No. P 43 34 374.0, filed on Oct. 8, 1993.

BACKGROUND OF THE INVENTION

1. Field of the Invention

This invention generally relates to a friction clutch for a transmission of a motor vehicle, wherein the friction clutch has a clutch disc with corresponding friction linings. In addition, the present invention also relates to a clutch disc for a friction clutch, and a method for manufacturing and using such a friction clutch in a motor vehicle.

In general, a friction clutch can have a hub installed in a non-rotational manner on a transmission shaft, which transmission shaft defines an axis of rotation. The clutch will also generally have a hub disc, with or without a torsional vibration damper, and, extending from the hub disc, there can be a lining support for supporting at least one friction lining, or ring, and preferably two friction rings disposed at some axial distance from one another. The at least one friction ring can generally be oriented concentrically to the axis of rotation and is fastened to the support. Further, the friction rings will have a contact surface disposed towards the lining supports, a friction surface disposed away from the lining supports, an inner radial contour defining an inside diameter, and an outer radial contour defining an outside diameter.

2. Background Information

Numerous varieties of clutch discs, or clutch plates of the general type described above are known. That is, friction clutches having the basic components of a hub, hub disc, lining support, and friction linings, or rings, are generally known. However, it has been determined that such known friction rings do not perform as well as can be expected. For example, during periods of increased usage of such clutches, such as repeatedly starting on an uphill slope, the friction linings can heat up and warp, thereby reducing frictional engagement with the opposing frictional surfaces, which could be the surface of an engine flywheel and an engagement surface of the clutch.

OBJECT OF THE INVENTION

In view of the above, the object of this invention is to increase the transmission capability of such a clutch disc, at the least possible expense.

SUMMARY OF THE INVENTION

The present invention teaches that this object can be achieved by providing a clutch disc for a friction clutch, wherein the clutch disc has at least one friction ring, which at least one friction ring has an inside diameter and an outside diameter, and wherein the friction ring is preferably configured such that the ratio of the outside diameter ($D_a$) to the inside diameter ($D_i$) is less than or equal to about 1.4.

Surprisingly, it has been determined that when the ratio of the outside diameter to the inside diameter ($D_a/D_i$) is less than or equal to about 1.4, the transmission capability of the clutch disc can assume a greater value than can be achieved with a friction clutch having clutch discs with a conventional diameter ratio. Such a conventional diameter ratio could possibly be on the order of about 1.5, or even possibly greater.

By experimentally reducing the diameter ratio, it was determined that less warpage of the friction rings occurred during periods of heating of the friction rings. On the other hand, this reduction of warpage by reducing the diameter ratio needed to be offset by the fact that sufficient friction material still needed to be present to provide the necessary frictional engagement of the clutch, while maintaining the overall size of the components essentially the same. Thus, essentially at least the above three factors needed to be considered in optimizing the diameter ratio of the friction rings.

As indicated above, the increase in transmission capability for a friction lining having a reduced diameter ratio is essentially due to the fact that during the frictional phase of the friction clutch, that is, during periods of slippage prior to complete engagement, and during the heating of the friction rings, the friction rings in accordance with the present invention, are typically subjected to a lower degree of warping when they have the diameter ratio as provided by the present invention. Thus, with a reduced amount of warpage, a greater proportion of the friction surfaces of the friction rings can remain in contact with the opposite friction surfaces of the friction clutch. As such, the heat of friction which is generated can be distributed more uniformly to the material in the friction rings, and thus the peak loads on the friction rings can be significantly reduced.

The present invention also teaches that the ratio of the outside diameter of the friction rings to the inside diameter can be in the range of about 1.25 to about 1.38. It has been determined that in this range, there can be a maximum of transmission capability without the need to take any additional measures. In other words, there can still be a sufficient amount of friction material present to provide the necessary frictional engagement, while the amount of warpage can be reduced to provide more efficient heat distribution throughout the clutch discs during periods of increased heat generation.

In one particularly advantageous configuration of the friction rings, the ratio of the diameters can be in the range of about 1.3. This diameter ratio has been experimentally determined to represent essentially an optimum between a low degree of warping when the temperature is increased as a result of friction during the friction process and the heat capacity of the friction rings.

In a further advantageous embodiment of the present invention, on a clutch plate on which there are two friction rings fastened to the support with the interposition of a spring device which acts essentially in the axial direction, the present invention also teaches that when the friction clutch is essentially fully engaged, there should still be a remaining spring travel. It has been determined that such a remaining spring travel essentially can make it possible for the friction rings to slightly "give" elastically, to a certain extent, when there is warping caused by temperature stress. The present invention teaches that this remaining spring travel be between about 0.10 mm and about 0.30 mm. Such a remaining spring travel is essentially sufficiently large, on one hand, to achieve the desired effect, and on the other hand the space occupied by the remaining spring travel is still essentially sufficiently small.

Further details regarding the present invention are presented herebelow with reference to the accompanying drawings. It should be understood that when the word "invention"

is used in this application, the word "invention" includes "inventions", that is, the plural of "invention". By stating "invention", the applicant does not in any way admit that the present application does not include more than one patentably and non-obviously distinct invention, and maintains the possibility that this application may include more than one patentably and non-obviously distinct invention. The Applicant hereby asserts that the disclosure of this application may include more than one invention, and, in the event that there is more than one invention, that these inventions may be patentable and non-obvious, one with respect to the other.

In summary, one aspect of the invention resides broadly in a method of producing a friction clutch for a motor vehicle, using the friction clutch, and, during use of the friction clutch, increasing transmission capability of the friction clutch for transmitting rotary power of an engine to a drive train of a motor vehicle during periods of increased frictional heating of the friction clutch, the friction clutch comprising: a housing; a clutch disc disposed within the housing and defining an axis of rotation and an axial direction parallel to the axis of rotation; pressure plate apparatus for axially moving the clutch disc within the housing to engage the clutch disc with a rotating member of an engine of a motor vehicle; and apparatus for moving the pressure plate apparatus away from the clutch disc to relieve engagement between the clutch disc and a rotating member of an engine of a motor vehicle; the clutch disc comprising: hub apparatus, the hub apparatus having a hub for engaging shaft apparatus of a transmission and a hub disc disposed about the hub; and at least one friction lining disposed with the hub disc for being engaged between the pressure plate apparatus and a rotating member of an engine of a motor vehicle; the at least one friction lining having a surface area, an inner diameter and an outer diameter; the method comprising the steps of: mass producing a plurality of friction linings, the mass producing comprising forming each of the plurality of friction linings to comprise a diameter ratio of outer diameter to inner diameter of less than about 1.4 to 1; mass assembling at least one of the plurality of friction linings with a hub disc; mass assembling a plurality of hub discs with a plurality of hubs to form a plurality of clutch discs; mass assembling at least one pressure plate apparatus, at least one clutch disc, and at least one apparatus for moving the pressure plate apparatus within a plurality of housings to form a plurality of friction clutches; mass assembling one friction clutch with each of a plurality of transmissions to form at least a portion of a plurality of drive trains; mass assembling a plurality of motor vehicles, the mass assembling a plurality of motor vehicles comprising mass assembling the at least a portion of the drive trains into each of the plurality of motor vehicles; and the method further comprising the steps of operating the motor vehicle, the steps of operating the motor vehicle comprising:

a) disengaging the at least one friction lining from a rotating member of the engine of the motor vehicle to disengage the transmission from the rotating member of the engine and at least reduce movement of the motor vehicle;

b) re-engaging the at least one friction lining with the rotating member of the engine of the motor vehicle to re-engage the transmission with the rotating member of the engine to increase movement of the motor vehicle;

c) repeating the disengaging and re-engaging to respectively at least reduce movement, and increase movement of the motor vehicle;

d) slipping the rotating member of the engine against the at least one friction lining prior to engagement of the at least one friction lining with the rotating member;

e) generating heat during the slipping and heating the at least one friction lining, the at least one friction lining warping upon heating of the at least one friction lining to a first degree; warping the at least one friction lining having the diameter ratio of less than about 1.4:1, to a first amount at the first degree of heating generated by steps a, b, c, d and e, the first amount of warping being less than a second amount of warping of a friction lining having a diameter ratio of substantially greater than about 1.4:1, at the first degree of heating generated by steps a, b, c, d and e; maintaining a proportion of the surface area of the at least one friction lining having the diameter ratio of less than about 1.4:1, available for engaging with the rotating member of the engine, the available proportion of the surface area of the at least one friction lining having the diameter ratio of less than about 1.4:1 being greater than an available proportion of a surface area of a friction lining having a diameter ratio of substantially greater than about 1.4:1; and the available proportion of the surface area of the at least one friction lining having the diameter ratio of less than about 1.4:1, providing a greater transmission capability than a transmission capability provided by an available proportion of the surface area of a friction lining having a diameter ratio of substantially greater than about 1.4:1.

Another aspect of the invention resides broadly in a mass-produced clutch disc for a mass-produced friction clutch, the mass-produced clutch disc comprising: a mass-produced hub for being non-rotationally connected to a transmission shaft, the hub defining an axis of rotation; a mass-produced hub disc disposed concentrically about the hub and extending radially away from the hub; at least one mass-produced friction lining disposed with the hub disc, the at least one mass-produced friction lining for being engaged between pressure plate apparatus of a friction clutch and a rotating member of an engine; the mass-produced hub disc comprising support apparatus for supporting the at least one mass-produced friction lining concentrically about the mass-produced hub disc and concentrically to the axis of rotation; and the at least one mass-produced friction lining comprising a ring shaped friction lining having an inner diameter disposed about the mass-produced hub and an outer diameter disposed about the inner diameter; and a ratio of the outer diameter to the inner diameter being less than about 1.4 to 1 to maximize heat absorption by the at least one friction lining and minimize warpage of the at least one mass-produced friction lining during use of the at least one mass produced friction lining in the mass-produced friction clutch.

A further aspect of the invention resides broadly in a friction lining in a mass-produced friction clutch comprising: a housing; a clutch disc disposed within the housing, the clutch disc defining an axis of rotation and an axial direction parallel to the axis of rotation; pressure plate apparatus disposed within the housing and movable in the axial direction, the pressure plate apparatus for applying an axial force to the clutch disc along the axial direction; biasing apparatus for biasing the pressure plate apparatus in the axial direction to apply the axial force to the clutch disc; the clutch disc comprising: a hub, the hub comprising apparatus for engaging shaft apparatus of a transmission, and the hub having a diameter and a circumference; a hub disc disposed concentrically about the hub and extending radially away from the hub, the hub disc having a first side and a second side; a friction lining, the friction lining comprising: a ring shaped friction lining having an inside diameter and an outside diameter; and a ratio of the outside diameter to the inside diameter being less than or equal to about 1.4 to 1.

BRIEF DESCRIPTION OF THE DRAWINGS

The present invention is explained in greater detail below with reference to embodiments illustrated in the accompanying drawings, in which.

DESCRIPTION OF THE PREFERRED EMBODIMENTS

Figure 1:
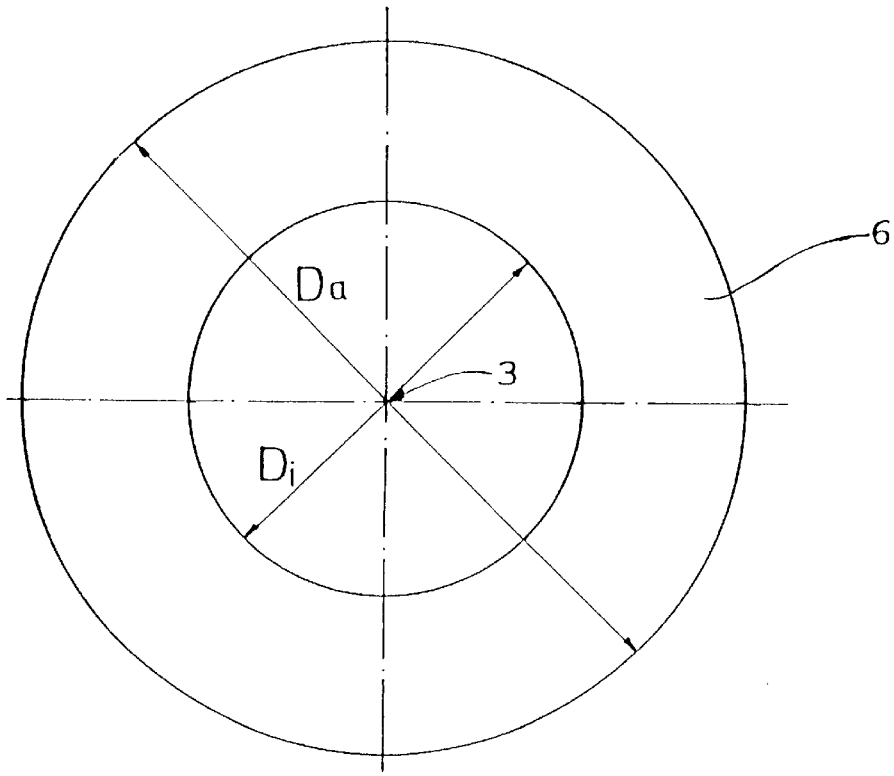
FIG. 1 shows a plan view of a friction ring.
Figure 1A:
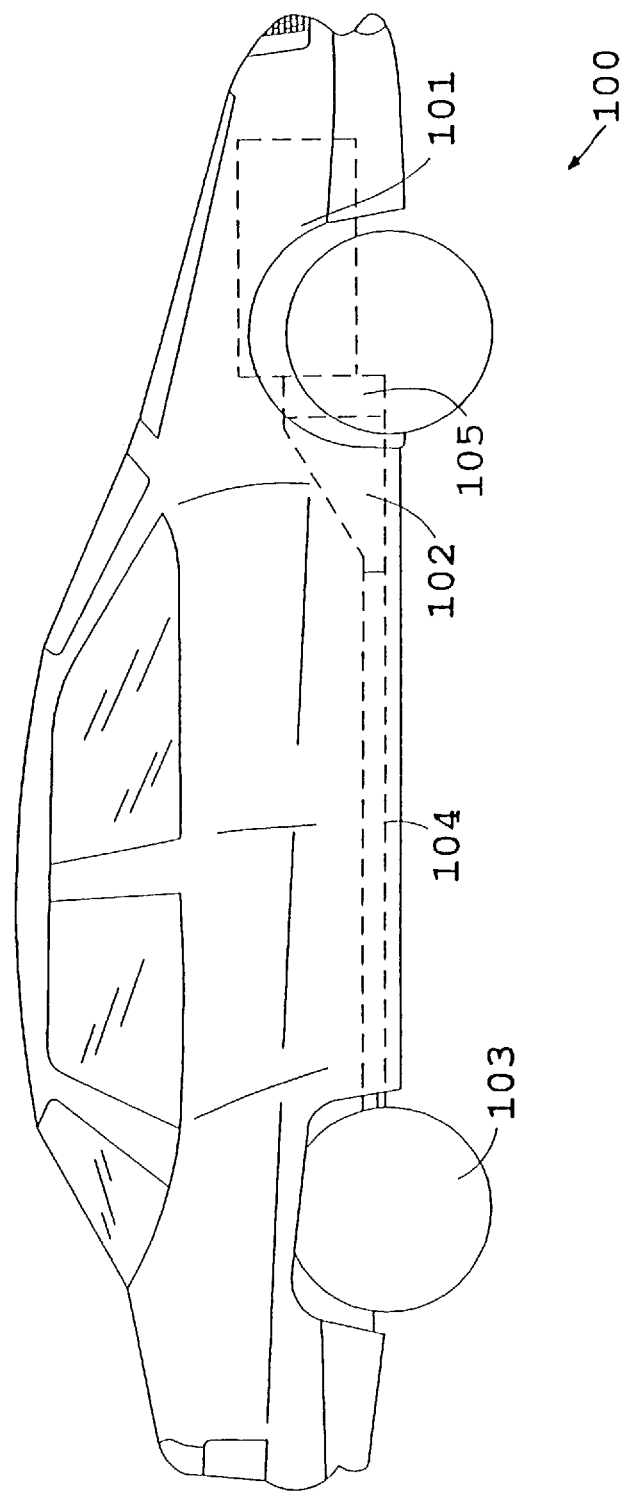
FIG. 1a shows a general depiction of a motor vehicle power train.

A depiction of a motor vehicle and corresponding power transmission components is shown in FIG. 1a, wherein the motor vehicle 100 could typically have an internal combustion engine 101 mounted in a forward portion thereof. The motor vehicle could also typically have a transmission 102 for transmission of mechanical power from the engine 101 to the rear vehicle wheels 103 via a drive shaft 104. A friction clutch 105 could be provided, in accordance with the present invention, for engaging the transmission 102 with the engine 101.

In the following discussion, it should be understood, that use of the terminology "clutch plate" can be interchangeable with the terminology "clutch disc", and likewise that "friction linings" can be interchangeable with "friction rings".

Figure 1B:
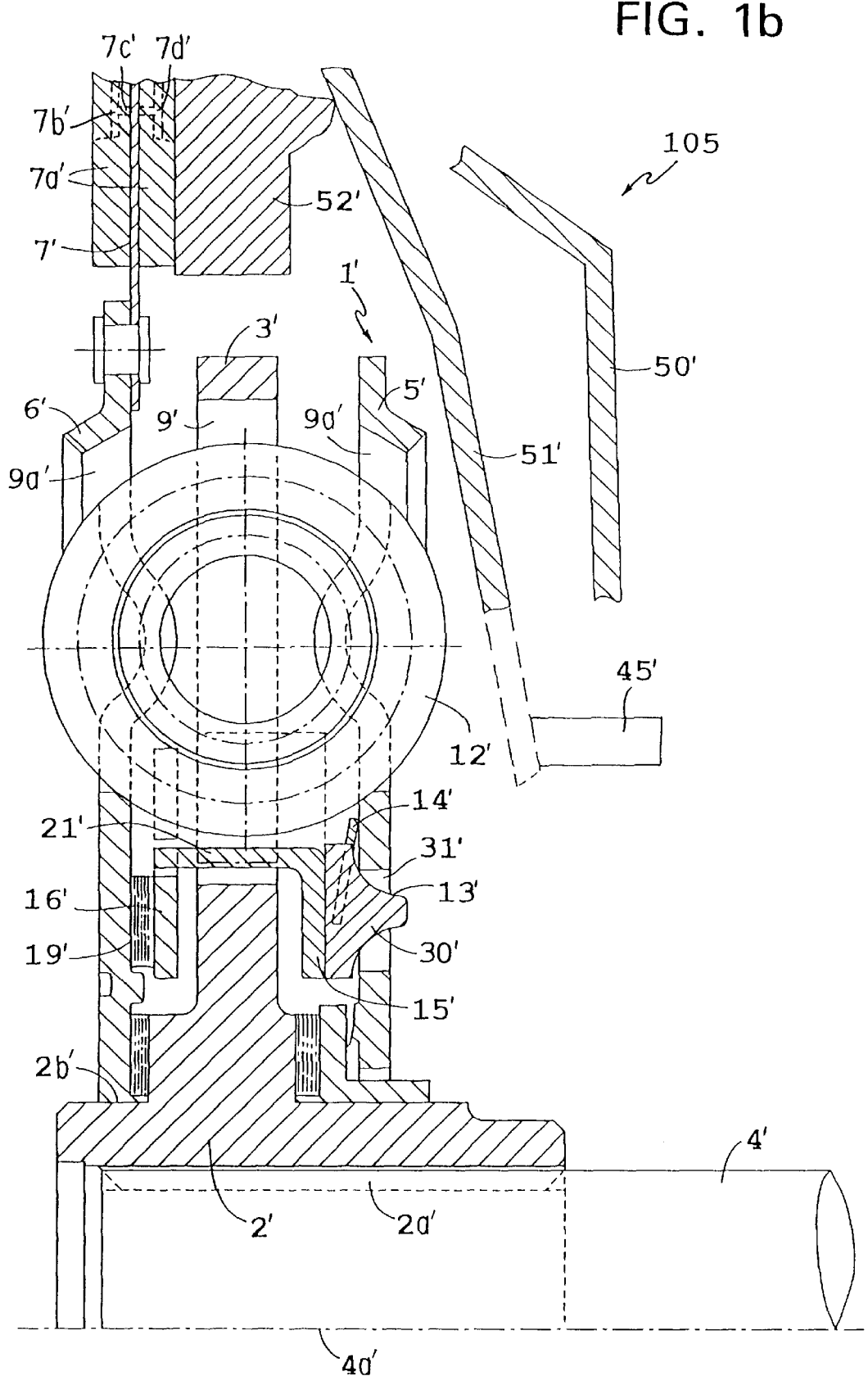
FIG. 1b shows a sectional view of a friction clutch.

As shown in FIG. 1b, a friction clutch 105 can generally have a clutch disc 1', which clutch disc 1' can have a hub 2' that can be configured to be mounted non-rotationally on a transmission shaft 4'. Such a mounting can be provided, for example, by means of a toothing 2a' disposed within the hub 2', which toothing 2a' would be configured to correspond to similar toothing on the transmission shaft 4'. In general, the transmission shaft 4' defines an axis of rotation 4a', about which the hub 2' rotates.

As is also shown in partial section in figure 1b, the friction clutch could also have a housing 50' for housing the components of the clutch therein. Within the friction clutch 105, the hub 2' of the clutch plate 1' can preferably be provided with a hub disc 3', which hub disc 3' can be integral with the hub 2', and which hub disc 3' can point radially outward from the hub 2'.

On both sides of the hub disc 3', cover plates 5' and 6' can preferably be provided, which cover plates 5' and 6' can be fixed in relation to one another, and held at an axial distance in relation to one another. At least one of the two cover plates, for example, the cover plate 6', as shown in FIG. 1b, in its radially outer region, can have a lining support 7', to which friction linings 7a' can be fastened. The two cover plates 5' and 6', for example, can be guided in the radial direction, by means of a bore in one of the two cover plates 5', 6', on a cylindrical guide surface 2b' of the hub 2', as also shown in FIG. 1b.

As shown in FIG. 1b, the friction rings 7a' can preferably be connected to one another and to the lining support 7' by means of a fastening rivet 7b', which fastening rivet 7b' runs through a passage 7c'. The rivets 7b' can form a non-detachable connection to the corresponding lining supports 7' by means of a rivet head 7d', which holds the rivet 7b' in place. The rivet 7b', rivet head 7d' and passage 7c' are further illustrated in FIG. 2a.

Within the housing 50' there could also be a pressure plate device 52' for applying an axial force to the friction linings 7a' to engage the linings 7a' with a counterthrust plate (not shown) which would essentially be rotating with the engine, to thereby cause the hub disc 3' to also rotate with the engine and turn the shaft 4'. The pressure source for applying this axial pressure to the pressure plate device 52' could be a biasing member, such as a spring device 51', which can bias the pressure plate 52' away from the housing 50' into engagement with the friction linings 7a'. In addition, as shown schematically in FIG. 1b, a pressure release device 45' can be provided for relieving the pressure of the pressure plate 52' on the friction linings 7a'. Such a device 52' can in essence work against the biasing force of spring device 51'. Such arrangements of pressure plate device 52', biasing members 51', pressure relief device 45' and housing 50' are generally well known, and are therefore shown only schematically in the figures.

In the hub disc 3' there will typically be windows 9' in which windows, coil springs 12' will generally be disposed. These coil springs 12' can essentially be disposed about the hub disc 3' over the same average diameter from the axis of rotation 4a', and can also essentially be uniformly placed about the circumference. Similar windows 9a' will typically be located in the cover plates 5' and 6' also for receiving the springs 12' therein.

As shown in FIG. 1b, additional components can be provided radially inside the coil springs 12' and between the cover plates 5' or 6' and the hub disc 3'. On the one side there can be a friction ring 13' with lugs 30' that can be guided in openings 31' of the cover plate 5', a spring 14', and a control plate 15'. On the opposite side there can be a thrust ring 16' and a friction ring 19'. The control plate 15' and thrust ring 16' can preferably be held non-rotationally to one another and at an axial distance from one another, by means of axially-bent tabs 21', which can be provided on either one, or both parts.

Figure 2:
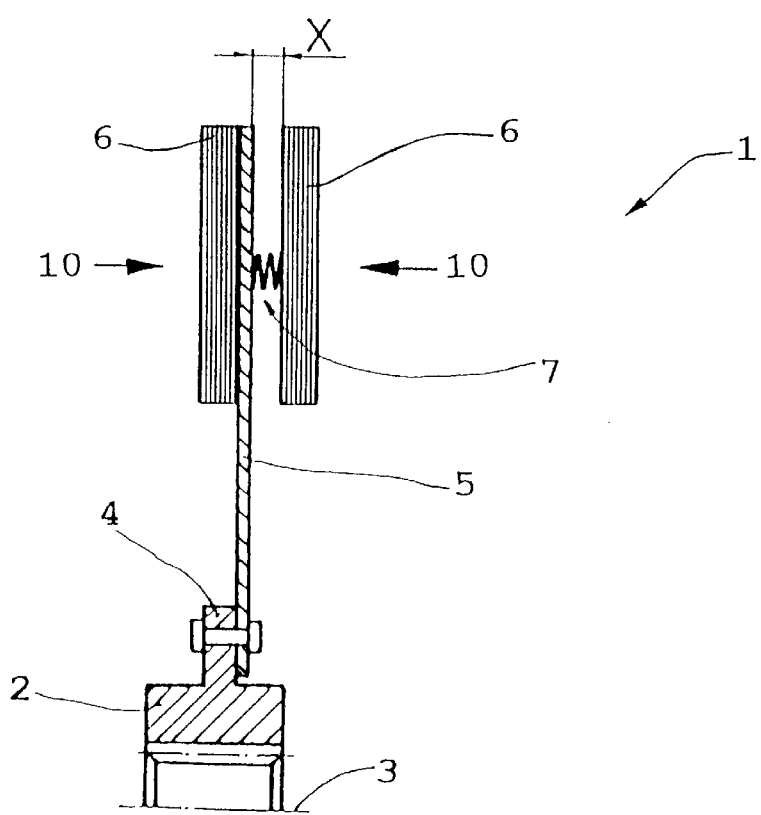
FIG. 2 shows a section through the upper half of a clutch plate with the use of friction rings as illustrated in FIG. 1.
Figure 2A:
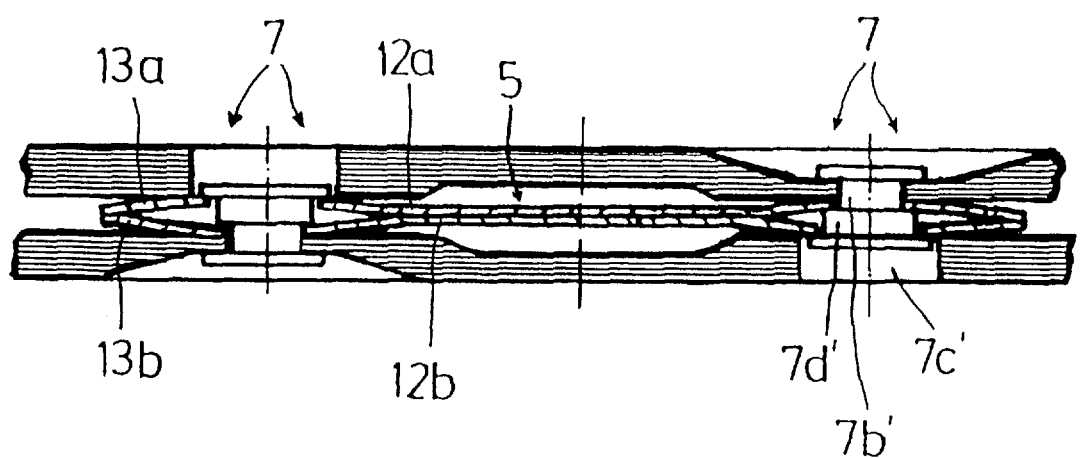
FIG. 2a shows one possible embodiment of a spring device disposed between adjacent friction rings.

It should generally be understood that the embodiments of the friction rings and lining supports as presented herebelow with reference to FIGS. 1, 2 and 2a, can be interchangeable with the embodiment of the friction clutch as presented hereabove with reference to FIG. 1b.

Referring now to the simplified depiction of a clutch disc as shown in FIG. 2, a clutch plate 1 can typically be oriented concentric to an axis of rotation 3. The clutch plate 1 can essentially comprise a hub 2 which can be installed non-rotationally on a transmission shaft (not shown in FIG. 2). Located on the hub 2, there can be a hub disc 4, to which hub disc 4 there can preferably be fastened a support 5 which can extend radially outwardly from the hub 2. There can also be a torsional vibration damper (not shown in FIG. 2, but essentially represented by the coil springs 12 as shown in FIG. 1b) on the support 5 or between the support 5 and the hub disc 4.

In the radially outer area of the support 5, there can be at least one friction ring 6, and two friction rings 6 fastened one on each side, whereby there can preferably be a spring device 7 between the two friction rings 6. One type of such spring device 7 can possibly be provided as depicted in FIG. 2a, wherein the lining support 5 can be formed by a pair of corrugated metal plates 12a, 12b, with the corrugations 13a, 13b, being of a size sufficient to act as biasing members.

Such a spring device 7, for example, can be active both between two friction rings 6 and also between one friction ring 6 and the support 5.

As shown in FIG. 1, a friction ring 6 can preferably have an inside diameter ($D_i$) and an outside diameter ($D_a$), wherein one can determine a ratio of the outside diameter ($D_a$) to the inside diameter ($D_i$). In accordance with the present invention, it has surprisingly been found that this ratio should be less than or equal to about 1.4. More particularly, this ratio can be between about 1.25 and about 1.38, while, in at least one configuration of the present invention, the ratio can essentially be in the range of approximately 1.3. In this range for the diameter ratio, the clutch plate 1 can absorb a maximum amount of heat generated by friction, as is generated, for example, when the vehicle is repeatedly required to start on an uphill slope.

The absorption of the heat generated by friction can be increased further by providing the spring device 7 which, when the clutch is fully engaged and there is a corresponding load on the friction rings 6 from the pressure plate and the counterpressure plate of the friction clutch, as shown by the arrows 10 in FIG. 2, has a remaining spring travel (X). This remaining spring travel (X) can advantageously be in the range from about 0.10 mm to about 0.30 mm. (Shown exaggerated in FIG. 2 for purposes of illustration only.)

Clutch discs can, for example, have an outer diameter in the range of between about 22.50 cm and about 22.70 cm. For example, a clutch disc manufactured by Sachs, West Germany, and having part No. 18-1861 969 301, has friction linings with an outside diameter of about 22.70 cm and an inside diameter of about 15.00 cm, while a clutch disc manufactured by Ford Motor Company and having part No. E57A7550GA, has friction linings with an outside diameter of about 22.50 cm and an inside diameter of about 14.90 cm. As such, both of these two known clutch discs have-friction linings with diameter ratios of about 1.51.

In the context of the size of such known friction linings, a friction lining in accordance with the present invention, and having a diameter ratio of about 1.3, could have an outside diameter of between about 21 cm to about 24 cm. Even more specifically the outer diameter could be between about 22.50 cm and 22.70 cm with a corresponding inside diameter in the range of between about 17.30 and 17.45. Alternatively, other sizes of friction linings having a diameter ratio as defined by the present invention would be possible, and variations on the available sizes would be well within the skill of the artisan. For example, for large motor vehicles, such as trucks, etc, the friction linings may be of a size of up to about 30 cm, or even greater, and for small vehicles, the size might be as small as possible 15 cm , or less. As such, the external diameter could possibly have a value of 15 cm, 16 cm, 17 cm, 18 cm, 19 cm, 20 cm, 21 cm, 22 cm, 23 cm, 24 cm, 25 cm, 26 cm, 27 cm, 28 cm, 29 cm and 30 cm.

Within the context of the present invention, one could maintain the diameter ratio in a number of ways. For instance, it it was desirable to maintain the outside diameter of a friction lining the same size as commonly used in the past, the inside diameter could be enlarged to provide the ratio in accordance with the present invention. Further, if it was desirable to reduce the overall diameter of the friction linings while maintaining the same inside diameter, only the outside dimension of the friction linings would need to be reduced. Alternatively, it might be desirable that a friction lining in accordance with the present invention has the same surface area as has commonly been used in the past. As such, both the inside and outside diameters would essentially need to be enlarged to a degree at which such a ratio, in accordance with the present invention was attainable, while preserving the surface area.

One further aspect of the present invention resides broadly in the manufacture and use of a clutch disc having the diameter ratio in accordance with the present invention in a transmission of a motor vehicle, or even more particularly to the use of such a clutch disc in a large number of mass produced motor vehicles, wherein the clutch disc itself, is also mass produced. The concept of mass production in essence, can possibly refer to the production of at least hundreds of units per day, and can possibly range up to the production of thousands of units per day. As such, a large number of such friction rings can be mass produced, the friction rings can then preferably be assembled in mass production with additional components, such as the hub and lining supports, to form friction discs. The mass produced friction discs can then be further assembled in mass production with additional components to form a friction clutch assembly. The friction clutch assemblies can then be installed in the transmission of motor vehicles during the mass production of the motor vehicles.

During operation of a motor vehicle equipped with friction discs, peak loads on the friction linings can then be significantly reduced. In operation of a motor vehicle, during a starting operation, the clutch of the motor vehicle is disengaged. Once the engine is running, and to begin movement, the clutch is re-engaged so that the friction linings can come into contact with the engine flywheel, during initial contact, the friction linings will slip with respect to the flywheel, thereby generating heat from the friction of the slippage. Then, the friction discs will engage with the engine flywheel, and rotate therewith to rotate the transmission of the motor vehicle.

During repeated startings and stoppings of the motor vehicle, there will be an increased number of periods of time when the slippage is occurring between the engine flywheel and the friction discs. During such frequently repeated instances of slippage, heat dissipation may not be able to occur quickly enough and heat can build up in the friction discs, and warpage can occur. Once warpage occurs, portions of the discs may no longer contact the engine flywheel, and the transmission capability of the clutch is typically reduced. Such warpage can also worsen the distribution of heat, as only the portions of the discs in contact with the flywheel will be heated, and these portion will typically be heated to a greater degree, thereby making the possibility of even greater warpage likely.

Instances as outlined above, wherein a motor vehicle is repeatedly needing to be stopped and then moved again, such as in heavy "stop and go" traffic, can be even more pronounced if the motor vehicle is travelling up a hillside, as a greater amount of slippage of the clutch discs would typically occur before engagement. Thus, heating can be even more pronounced. Also, the load of the motor vehicle, that is, the number of passengers, the cargo, or if the motor vehicle is hauling a trailer, or boat, etc., can also adversely affect the heating of the friction discs. In this regard, the greater the load, the greater the amount of slippage that would occur prior to engagement, the greater the amount of heat that would be generated, and the more pronounced the warpage and uneven heat distribution would become.

By providing a motor vehicle transmission with clutch discs in accordance with the present invention, the clutch discs will typically be able to withstand a greater amount of heating before warpage might occur. Thus, a greater surface area of the discs in accordance with the present invention will be available for contact with the engine flywheel, thereby providing an increased transmission capability, and enabling heat distribution to remain more uniform for longer periods of time, thus reducing peak loads on the friction linings.

One feature of the invention resides broadly in the clutch plate for a friction clutch comprising a hub which is non-rotationally installed on a transmission shaft, a hub disc with or without torsional vibration dampers, and a support for two friction rings which are at some axial distance from one another, are oriented concentric to the axis of rotation and are fastened to the support, and which have an inside diameter and an outside diameter, characterized by the fact that the ratio of the outside diameter ($D_a$) to the inside diameter ($D_i$) is less than or equal to 1.4.

Another feature of the invention resides broadly in the clutch plate, characterized by the fact that the ratio of the outside diameter ($D_a$) to the inside diameter ($D_i$) is in the range from 1.25 to 1.38.

Still another feature of the invention resides broadly in the clutch plate, characterized by the fact that the ratio of the outside diameter ($D_a$) to the inside diameter ($D_i$) is in the range of 1.3.

Yet another feature of the invention resides broadly in the clutch plate, whereby the two friction rings are fastened to the support with the interposition of a spring device which acts essentially in the axial direction, characterized by the fact that when the friction clutch is engaged there is a remaining spring travel (X).

Still yet another feature of the invention resides broadly in the clutch plate, characterized by the fact that the remaining spring travel (X) is from 0.10 to 0.30 mm.

Some examples of clutch discs and friction linings, which could have components interchangeable with the embodiments of the present invention may be disclosed by the following U.S. Pat. No. 5,000,304 to Koch, Raab, Dotter and Ament, entitled "Clutch Disc"; U.S. Pat. No. 4,941,558 to Schraut, entitled "Clutch Disc"; U.S. Pat. No. 4,854,438 to Weissenberger and Huditz, entitled "Clutch Disc for a Friction Disc Clutch"; U.S. Pat. No. 4,741,423 to Hayen, entitled "Clutch Disc for a Friction Clutch"; and U.S. Pat. No. 4,715,485 to Rostin, Tomm and Hartig, entitled "Clutch Disc for a Motor Vehicle Friction Clutch".

Some examples of transmissions in which the present invention may possibly be incorporated may be disclosed by the following U.S. Pat. No. 5,199,316 to Hoffman, entitled "Fully-Synchronized Multiple Speed Manual Transmission for Motor Vehicles"; U.S. Pat. No. 4,458,551 to Winter, entitled "Manual Transmission"; and U.S. Pat. No. 3,858,460 to Porter et al., entitled "Pour Speed Manual Transmission and Control".

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if any, described herein.

All of the patents and patent applications recited herein and in the Declaration attached hereto, are hereby incorporated by reference as if set forth in their entirety herein.

The corresponding foreign patent publication applications, namelyt Federal Republic of Germany Patent Application No. P 43 34 374.0, filed on Oct. 8, 1993, having inventor Hans Jürgen Drexl, and DE-OS P 43 34 374.0 and DE-PS P 43 34 374.0, are hereby incorporated by reference as if set forth in their entirety herein.

The details in the patents, patent applications and publications are incorporable into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. A conventional motor vehicle friction clutch, said friction clutch comprising:

a housing;

a clutch disc disposed within said housing, said clutch disc defining an axis of rotation and an axial direction parallel to the axis of rotation;

a pressure plate disposed within said housing and being movable in the axial direction, said pressure plate for applying an axial force to said clutch disc along the axial direction;

structure to bias said pressure plate in the axial direction;

said clutch disc comprising:

a hub, said hub comprising an arrangement to engage a transmission shaft;

a hub disc disposed concentrically about said hub and extending radially away from said hub;

two friction linings disposed adjacent said hub disc;

apparatus to support said two friction linings concentrically about said hub and concentrically about the axis of rotation;

said two friction linings being attached to said supporting apparatus;

said two friction linings being a first friction lining and a second friction lining;

said supporting apparatus comprising a friction lining carrier, said friction lining carrier comprising:

lining springs to bias said first friction lining and said second friction lining in the axial direction away from one another, said first friction lining and said second friction lining being spaced-apart from one another;

said lining springs being configured to define a biasing distance of travel between said first friction lining and said second friction lining upon said first friction lining and said second friction lining being engaged between said pressure plate and a rotating member of an engine;

said biasing distance of travel being of a minimum dimension sufficient to compensates solely for thermal deformation in friction areas of said friction clutch at maximum operating temperatures;

each of said two friction linings comprising a ring-shaped friction lining having an inside diameter and an outside diameter; and said outside diameter and said inside diameter of each of said two friction linings being dimensioned in relation to one another to minimize thermal deformation in friction areas of said friction clutch upon application of heavy thermal load.

2. The friction clutch according to claim 1 wherein:

said pressure plate has an inside diameter and an outside diameter; and said inside diameters of both of said two friction linings are substantially the same as said inside diameter of said pressure plate.

3. The friction clutch according to claim 2, wherein said dimension of said outside diameter to said inside diameter of each of said two friction linings is a ratio of less than about 1.4 to 1.

4. The friction clutch according to claim 3, wherein said biasing distance of travel is between about 0.10 mm and about 0.3 mm.

* * * * *

UNITED STATES PATENT AND TRADEMARK OFFICE
CERTIFICATE OF CORRECTION

PATENT NO. : 5,850,899 Page 1 of 1
DATED : December 22, 1998
INVENTOR(S) : Hans Jürgen Drexl It is certified that error appears in the above-identified patent and that said Letters Patent is hereby corrected as shown below:

<u>Title page,</u>
Item [56], References Cited, U.S. PATENT DOCUMENTS, insert the following new reference:
-- 5,184,704    2/93    Hays --.
FOREIGN PATENT DOCUMENTS, insert the following new reference:
-- 06 25 868   2/1936  Germany --.

Item [57], ABSTRACT,
Line 5, before "and", delete "1.41" and substitute therefor -- 1.4, --.

<u>Column 1,</u>
Line 7, before "which", delete "abandonded," and substitute therefor -- abandoned, --.

<u>Column 5,</u>
Line 64, after "can", delete "preferably".

<u>Column 9,</u>
Line 57, after "entitled", delete " "Pour" and substitute therefor -- "Four --.

<u>Column 10,</u>
Line 5, after "applications," delete "namelyt" and substitute therefor -- namely, --.

Signed and Sealed this

Second Day of March, 2004

JON W. DUDAS
*Acting Director of the United States Patent and Trademark Office*